(12) United States Patent
Wu et al.

(10) Patent No.: US 10,755,055 B2
(45) Date of Patent: Aug. 25, 2020

(54) LANGUAGE RECOGNITION METHOD, APPARATUS, AND SYSTEM

(71) Applicant: Alibaba Group Holding Limited, Grand Cayman (KY)

(72) Inventors: Jinpeng Wu, Hangzhou (CN); Zhenyu Hou, Hangzhou (DE)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/079,188

(22) PCT Filed: Mar. 16, 2017

(86) PCT No.: PCT/CN2017/076873
§ 371 (c)(1),
(2) Date: Aug. 23, 2018

(87) PCT Pub. No.: WO2017/162082
PCT Pub. Date: Sep. 28, 2017

(65) Prior Publication Data
US 2019/0065479 A1    Feb. 28, 2019

(30) Foreign Application Priority Data
Mar. 25, 2016   (CN) .......................... 2016 1 0179961

(51) Int. Cl.
*G06F 17/28* (2006.01)
*G06F 40/58* (2020.01)
(Continued)

(52) U.S. Cl.
CPC ............ *G06F 40/58* (2020.01); *G06F 40/211* (2020.01); *G06F 40/253* (2020.01); *G10L 15/005* (2013.01); *G10L 15/30* (2013.01)

(58) Field of Classification Search
None
See application file for complete search history.

(56) References Cited

U.S. PATENT DOCUMENTS

| 4,958,285 A | 9/1990 | Tominaga |
| 5,136,503 A | 8/1992 | Takagi et al. |

(Continued)

FOREIGN PATENT DOCUMENTS

| CN | 102629213 A | 8/2012 |
| CN | 103092669 A | 5/2013 |
| EP | 1324213 A2 | 7/2003 |

OTHER PUBLICATIONS

International Search Report to corresponding International Application No. PCT/CN2017/076873 dated Jun. 21, 2017 (2 pages).
(Continued)

*Primary Examiner* — Satwant K Singh
(74) *Attorney, Agent, or Firm* — James J. DeCarlo; Greenberg Traurig, LLP (57) ABSTRACT

Disclosed are language recognition methods, apparatuses, and systems, which are related to the field of information technology. A corresponding grammar rule may be obtained through mapping of a data structure inputted by a user and thereby improving the processing efficiency in language recognition. The main technical solutions of the disclosure are as follows: first, information of a service data structure sent by a client is received. Then, a grammar rule is obtained from the information of the service data structure; upon receiving to-be-recognized sentence information sent by the client, the to-be-recognized sentence information is translated with the grammar rule and a translation result is stored in the service data structure; and the translation result in the service data structure is sent to the client, so that the client displays the translation result. The disclosure is mainly used for language recognition.

19 Claims, 7 Drawing Sheets

(51) Int. Cl.
*G10L 15/30* (2013.01)
*G10L 15/00* (2013.01)
*G06F 40/211* (2020.01)
*G06F 40/253* (2020.01)

(56) References Cited

U.S. PATENT DOCUMENTS

| | | | |
|---|---|---|---|
| 6,957,184 B2 | 10/2005 | Schmid et al. | |
| 6,973,429 B2 | 12/2005 | Smith | |
| 7,080,004 B2 | 7/2006 | Wang et al. | |
| 7,185,276 B2 | 2/2007 | Keswa | |
| 7,302,383 B2* | 11/2007 | Valles | G06F 40/30 704/9 |
| 7,529,658 B2 | 5/2009 | Bulusu et al. | |
| 8,041,697 B2 | 10/2011 | Rayner et al. | |
| 8,214,196 B2 | 7/2012 | Yamada et al. | |
| 8,365,138 B2* | 1/2013 | Iborra | G06F 8/30 717/104 |
| 8,397,157 B2 | 3/2013 | Levy | |
| 8,543,374 B2 | 9/2013 | Dymetman | |
| 8,977,536 B2 | 3/2015 | Och | |
| 9,002,700 B2* | 4/2015 | Hoover | G06F 17/274 704/9 |
| 9,292,271 B2 | 3/2016 | Ross | |
| 9,342,504 B2 | 5/2016 | Ehsani et al. | |
| 9,465,793 B2* | 10/2016 | Hoover | G06F 17/274 |
| 10,176,256 B1* | 1/2019 | Fatourechi | G06F 17/3082 |
| 10,387,565 B2* | 8/2019 | Hoover | G06F 17/2775 |
| 2003/0033595 A1* | 2/2003 | Takagi | G06F 17/5045 717/143 |
| 2003/0121026 A1 | 6/2003 | Wang et al. | |
| 2004/0153323 A1 | 8/2004 | Charney et al. | |
| 2005/0154580 A1 | 7/2005 | Horowitz et al. | |
| 2009/0192787 A1* | 7/2009 | Roon | G06F 17/2715 704/9 |
| 2010/0332217 A1* | 12/2010 | Wintner | G06F 17/271 704/9 |
| 2012/0191446 A1* | 7/2012 | Binsztok | G06F 8/30 704/9 |
| 2015/0057994 A1* | 2/2015 | Fang | G09B 5/125 704/4 |
| 2015/0160934 A1* | 6/2015 | Beit-Aharon | G06F 8/76 717/137 |
| 2015/0278201 A1 | 10/2015 | Prokofyev et al. | |
| 2016/0246772 A1* | 8/2016 | Hoover | G06F 17/274 |
| 2019/0108183 A1* | 4/2019 | Fatourechi | G06F 40/205 |

OTHER PUBLICATIONS

Brown et al., "Context-Free Grammar Compiler Speech Understanding Systems," ICSLP 94: 1994 International Conference on Spoken Language Processing. Yokohama, Japan, Sep. 18-22, 1994, pp. 21-24 (1994).

Extended European Search Report to corresponding EP Application No. 17769359.5 dated Oct. 8, 2019 (11 pages).

Wang et al., "Grammar learning for spoken language understanding," Automatic Speech Recognition and Jnderstanding, ASRU, '01, IEEE Workshop on Dec. 9-13, 2001, Piscataway, NJ, USA, IEEE (2001).

* cited by examiner

LANGUAGE RECOGNITION METHOD, APPARATUS, AND SYSTEM

CROSS-REFERENCE TO RELATED APPLICATION

The disclosure claims priority to Chinese Patent Application No. 201610179961.2, filed on Mar. 25, 2016 entitled "LANGUAGE RECOGNITION METHOD, APPARATUS, AND SYSTEM" and Int'l Application No. PCT/CN2017/076873 filed on Mar. 16, 2017 entitled "LANGUAGE RECOGNITION METHOD, APPARATUS, AND SYSTEM," both of which are incorporated herein by reference in their entirety.

BACKGROUND

Technical Field

The disclosure relates to the field of information technology, and particularly, to a language recognition method, apparatus, and system.

Description of the Related Art

Language recognition technology has become more mature with continuous development in information technology. Language recognition has always been an important part of computer science and has been widely applied to other areas like compilation, script interpretation, and natural language processing. In general, language recognition means recognizing a specific language by using a computer. The goal of language recognition is to convert a letter sequence inputted by a user into a data structure that can be recognized and processed by the computer.

Currently, when it is required to recognize sentence information in a language inputted by a user, language recognition may be implemented through some language recognition tools, such as ANTLR (Another Tool for Language Recognition), Yacc (Yet Another Compiler Compiler), and Lex (Lexical Compiler). Specifically, a user first needs to predefine a grammar rule corresponding to the language; next the grammar rule needs to be converted into a grammar format supported by a language recognition tool; and the user inputs the grammar rule in the supported grammar format into the language recognition tool to generate a translator capable of recognizing the language. The translator then translates an inputted letter sequence. Because the translation result is stored in a data structure generated by the language recognition tool and the data structure is usually different from a service data structure, the user needs to reformat the translation result to store it in the service data structure, which in turn becomes the data structure needed for service processing.

However, the step of defining the grammar rule requires a deep understanding of formal language processing and compilation principles. An extra burden is imposed on the user when a user does not understand compilation principles or has no knowledge in grammar. Besides, the process of storing the translation result in the service data structure needs to be manually implemented. The processing efficiency is greatly affected when language recognition of inputted sentences is performed in batches.

SUMMARY

In view of this, embodiments of the disclosure provide a language recognition method, apparatus, and system, aiming at solving the problems that an extra burden is imposed on the user due to the need of defining a grammar rule by the user himself and that the process of manually storing the translation result in the service data structure affects the processing efficiency of language recognition.

To achieve the aforementioned objectives, the disclosure provides the following technical solutions.

In one aspect, the disclosure provides a language recognition method, the method comprising: receiving, from a client, information of a service data structure obtaining a grammar rule from the received information of the service data structure upon receiving to-be-recognized language information from the client, translating the to-be-recognized sentence information by using the grammar rule and storing a translation result in the service data structure; and sending to the client the translation results in the service data structure so that the client displays the translation result.

In another aspect, the disclosure provides another language recognition method, comprising: upon receiving information of a service data structure inputted by a user, sending the information of the service data structure to a server, so that the server obtains a grammar rule from the information of the service data structure upon receiving to-be-recognized sentence information inputted by the user, sending to the server the to-be-recognized sentence information, so that the server translates the to-be-recognized sentence information with the grammar rule and stores a translation result in the service data structure; and receiving the translation result in the service data structure sent by the server and displaying the translation result.

In still another aspect, the disclosure provides a server, comprising: a receiving unit, configured to receive, from a client, information of a service data structure an obtaining unit, configured to obtain a grammar rule from the information of the service data structure received by the receiving unit a translation unit, configured to do the following: upon receiving to-be-recognized language information from the client, translate the to-be-recognized sentence information by using the grammar rule a storage unit, configured to store a translation result of the translation unit in the service data structure; and a sending unit, configured to send to the client the translation results stored in the service data structure so that the client displays the translation result.

In yet another aspect, the disclosure provides a client, comprising: a sending unit, configured to do the following: upon receiving information of a service data structure inputted by a user, send the information of the service data structure to a server, so that the server obtains a grammar rule from the information of the service data structure the sending unit is further configured to do the following: upon receiving to-be-recognized sentence information inputted by the user, send to the server the to-be-recognized sentence information, so that the server translates the to-be-recognized sentence information with the grammar rule and stores a translation result in the service data structure a receiving unit, configured to receive the translation result in the service data structure sent by the server; and a display unit, configured to display the translation result that the receiving unit has received.

In yet another aspect, the disclosure provides a language recognition system, comprising: a server and a client, wherein the client is configured to do the following: upon receiving information of a service data structure inputted by a user, send the information of the service data structure to the server the server is configured to receive the information of the service data structure sent by the client; and obtain a grammar rule from the information of the service data structure the client is further configured to do the following: upon receiving the to-be-recognized sentence information inputted by the user, send the to-be-recognized sentence information to the server the server is further configured to do the following: upon receiving the to-be-recognized language information from the client, translate the to-be-recognized sentence information by using the grammar rule and store a translation result in the service data structure; and send to the client the translation result in the service data structure; and the client is further configured to receive the translation result in the service data structure sent by the server and display the translation result.

By means of these technical solutions, the embodiments of the disclosure have at least the following advantages.

In the language recognition method, apparatus, and system provided in the embodiments of the disclosure, first, information of a service data structure inputted by a user and sent by a client is received. Then, a grammar rule is obtained from the information of the service data structure; and upon receiving to-be-recognized sentence information sent by the client, the to-be-recognized sentence information is translated with the grammar rule and a translation result is stored in the service data structure. As compared with current systems where a user needs to define a grammar rule by himself, the disclosure enables the obtaining of a grammar rule from the information of the service data structure inputted by a user so as to translate inputted sentence information with the grammar rule. The user does not need to figure out the grammar rule of a language by himself; the learning burden of the user is alleviated, thereby simplifying the process of language recognition and facilitating the user operation. Additionally, as compared with current systems where the translation result needs to be manually stored in a service data structure, the disclosure enables translation with the grammar rule obtained from the information of the service data structure, and the data structure where the translation result is stored is exactly the service data structure needed for storage, so that a process of automatically storing the translation result in the service data structure can be implemented, thereby improving the processing efficiency in language recognition.

The above description is merely an overview of the technical solutions of the disclosure. To better understand the technical means of the disclosure to enable implementation according to the contents of the description and to make the aforementioned and other objectives, features, and advantages of the disclosure comprehensible, specific embodiments of the disclosure are described below.

BRIEF DESCRIPTION OF THE DRAWINGS

Other advantages and benefits will become evident to a person skilled in the art by reading the following detailed description of the embodiments. The accompanying drawings are for the illustrating purposes of the embodiments only and are not to be considered to limit the disclosure. Moreover, in the accompanying drawings, same reference symbols are used to represent the same parts. In the accompanying drawings.

DETAILED DESCRIPTION

Exemplary embodiments of the present disclosure will be described below in more detail with reference to the accompanying drawings. Although the accompanying drawings show exemplary embodiments of the present disclosure, the present disclosure may be implemented in various forms and should not be limited by the embodiments described herein. Instead, these embodiments are provided so that the present disclosure will be better understood, and the scope of the present disclosure can be fully conveyed to those skilled in the art.

Figure 1:
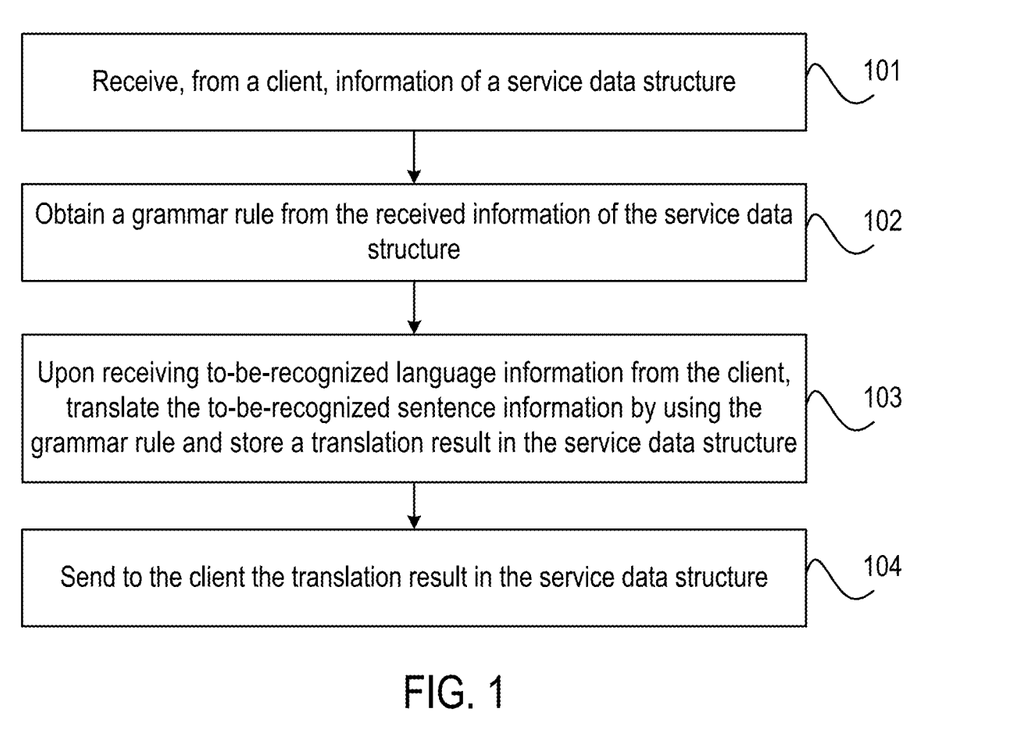
FIG. 1 is a flow diagram illustrating a language recognition method according to some embodiments of the disclosure.

An embodiment of the disclosure provides a language recognition method, which may be applied to a server. As shown in FIG. 1, the method includes the following steps.

Step 101: Receive, from a client, information of a service data structure.

The information of the service data structure comprises a service data structure needed for service processing.

In the illustrated embodiment, a user may define a service data structure according to service requirements and input the defined service data structure to the client. The client sends the service data structure to the server, and the server receives the information of the service data structure having the service data structure and triggers an operation of obtaining a grammar rule.

Step 102: Obtain a grammar rule from the information of the service data structure.

The grammar rule may be a specific rule that sentences in a language generally meet. The grammar rule may consist of four parts, which are respectively a start symbol, a terminal symbol, a nonterminal symbol, and a derivation rule. Specifically, the grammar is a 4-tuple: grammar G={VT, VN, S, P}, where VT is a non-empty finite set of symbols, each element of which is a terminal symbol. VN is also a non-empty finite set of symbols, each element of which is a nonterminal symbol, and an intersection of VT and VN is an empty set. S∈VN, i.e., S belongs to VN and is the start symbol of the grammar G. P is a non-empty finite set, an element of which becomes a production, namely the derivation rule. The form of the production rule may be defined as α→β, where α is called the left part of the production rule, β is called the right part of the production rule; the symbol "→" represents "is defined as"; and α, β∈(VT ∪VN), i.e., α and β are symbol strings consisting of terminal symbols and nonterminal symbols. The start symbol S must appear at least once in the left part of a certain production rule.

Specifically, the four parts of the grammar rule may be obtained through mapping from the service data structure. For example, the service data structure inputted by the user may be a Java® data structure; the start symbol may be an identifier corresponding to a root of the service data structure; the terminal symbol may be an identifier of an atomic-type attribute in a Java® class; the nonterminal symbol may be a class name of all non-atomic types involved in the service data structure; and the derivation relationship may be determined through an inclusion relationship between classes.

Step 103: Upon receiving to-be-recognized language information from the client, translate the to-be-recognized sentence information by using the grammar rule and store a translation result in the service data structure.

The to-be-recognized sentence information may be a letter sequence inputted by the user. The letter sequence includes, but is not limited to, characters in a natural language, which may be inseparable entities in any sequence when being. For example, Morse code letters are dots and dashes.

Step 104: Send to the client the translation result in the service data structure.

Further, the client is enabled to display the translation result.

In the illustrated embodiment, upon receiving to-be-recognized sentence information sent by the client, language recognition is triggered. The inputted to-be-recognized sentence information is translated by invoking the grammar rule obtained in step 102. In the translation process, a translation result is synchronously stored in the data structure inputted by the user, because the data structure is the actual service data structure and can be directly used. It should be noted that as compared with current systems, in the embodiment of the disclosure, there is no information redundancy between the grammar rule obtained from the information of the service data structure and the service data structure; and synchronous modification is not required upon each update, so that the update efficiency is improved, which in turn facilitates the program migration, upgrade, and so on. Moreover, since the translation process is highly automatic, this method can be used to implement automatic data serialization and deserialization.

In the language recognition method provided in the embodiments of the disclosure, first, information of a service data structure inputted by a user and sent by a client is received. Then, a grammar rule is obtained from the information of the service data structure; and upon receiving to-be-recognized sentence information sent by the client, the to-be-recognized sentence information is translated with the grammar rule and a translation result is stored in the service data structure. As compared with current systems where a user needs to define a grammar rule by himself, the disclosure enables the obtaining of a grammar rule from the information of the service data structure inputted by a user so as to translate inputted sentence information with the grammar rule. The user does not need to figure out the grammar rule of a language by himself; the learning burden of the user is alleviated, thereby simplifying the process of language recognition and facilitating the user operation. Additionally, as compared with current systems where the translation result needs to be manually stored in a service data structure, the disclosure enables translation with the grammar rule obtained from the information of the service data structure, and the data structure where the translation result is stored is exactly the service data structure needed for storage, so that a process of automatically storing the translation result in the service data structure can be implemented, thereby improving the processing efficiency in language recognition.

Figure 2:
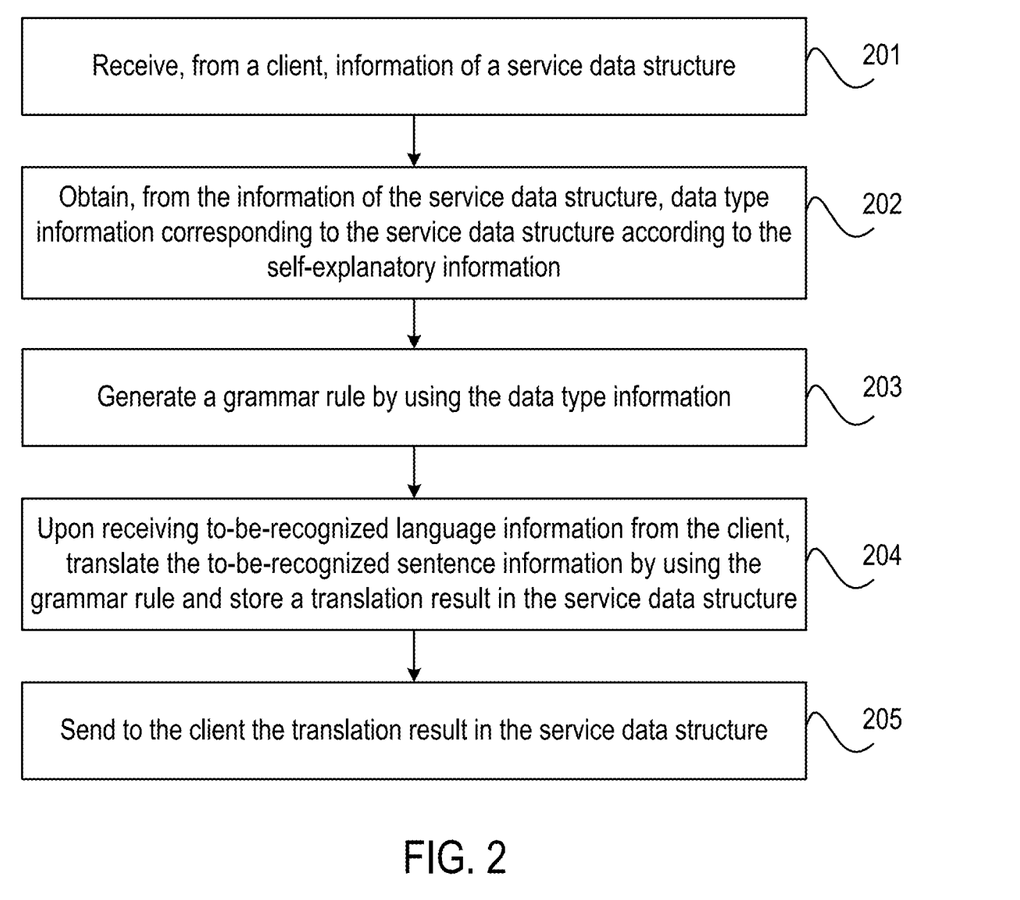
FIG. 2 is a flow diagram illustrating another language recognition method according to some embodiments of the disclosure.

Further, an embodiment of the disclosure provides another language recognition method, which may be applied to a server. As shown in FIG. 2, the method includes the following steps.

Step 201: Receive, from a client, information of a service data structure.

The information of the service data structure comprises reflection information of data types corresponding to the service data structure. The reflection information may be annotation information of a data structure obtained through a reflection mechanism. The so-called reflection mechanism may be a process of automatically obtaining data type features of the data structure; and the process includes, but is not limited to, a reflection mechanism for an object-oriented language. Any mechanism enabling a computer to automatically describe its own data structure and data relationship is a reflective, or reflection, process.

In the embodiment of the disclosure, upon receiving the information of the service data structure sent by the client, an operation of obtaining a corresponding grammar rule is triggered.

Step 202: Obtain, from the information of the service data structure, data type information corresponding to the service data structure according to the reflection information.

The data type information comprises attribute information corresponding to the data types and an inclusion relationship between classes.

Specifically, all data types and relationships are obtained according to the reflection information of the data types; and the data structure is mapped into corresponding grammar elements locally. For example, a name of an atomic-type attribute, a class name of a non-atomic type, and an inclusion relationship between classes may be obtained from the information of the service data structure according to the reflection information.

It should be noted that reflection information can help better explain a data structure defined by a user. Therefore, a computer language, such as Java® or C#, which has reflection information and can obtain annotation content through a reflection mechanism, is more suitable for the implementation process of language recognition in the embodiment of the disclosure.

Step 203: Generate a grammar rule by using the data type information.

Reference may be made to the corresponding description in step 102 for the explanation of the concept of the grammar rule. Details will not be described herein again but are incorporated herein by reference in their entirety.

Specifically, the step 203 includes: determining a start symbol, a terminal symbol, and a nonterminal symbol corresponding to the grammar rule according to the attribute information corresponding to the data types; determining a derivation rule corresponding to the grammar rule by using the inclusion relationship between the classes; and generating the grammar rule with the start symbol, the terminal symbol, the nonterminal symbol, and the derivation rule.

For example, the mapping process of a typical Java® data structure and a grammar rule as may be used an example. The start symbol may be an identifier corresponding to a root of the data structure; the terminal symbol may be an identifier of an atomic-type attribute in a Java® class, where a value corresponding to the identifier may be automatically converted by the system according to a data type; the nonterminal symbol may be a class name of all non-atomic types involved in the data structure; and the derivation relationship may be determined through an inclusion relationship between classes. Specifically, if Class A has two attributes a and b and data types thereof are respectively Class String and Class B, the derivation rule may be extracted as A→aB.

Step 204: Upon receiving to-be-recognized language information from the client, translate the to-be-recognized sentence information by using the grammar rule and store a translation result in the service data structure.

It should be noted that through the method provided in the embodiment of the disclosure, the user neither needs to define the grammar rule or understand the language itself, nor does he need to learn a grammar definition format of a language recognition tool. That is, no extra learning burden is imposed on the user. The user only needs to input a target data structure so as to obtain the corresponding grammar rule by mapping using the inputted data structure and start to recognize the language, which provides convenience for the user.

In the embodiment of the disclosure, before the step 204, the method may further include: inspecting whether the grammar rule has grammatical errors; and if so, adjusting the grammar rule. The step 204 may specifically include: translating the to-be-recognized sentence information by using the adjusted grammar rule. Further, if the grammar rule does not have grammatical errors, it indicates that the grammar rule can be directly invoked for translating the to-be-recognized sentence information.

Specifically, when the grammar rule obtained from the information of the service data structure is not clean enough and has grammatical errors such as left recursion and ambiguity, the grammar rule needs to be adjusted by, for example, changing the internal ordering of the rule so as to adapt to the subsequent explanation process. The original source of the grammar rule needs to be recorded in the changing process, so as to store the recognition result at a correct location. It should be noted that when the grammar rule has grammatical errors, the grammar rule is adjusted and the received to-be-recognized sentence information is translated using the adjusted grammar rule. The sentence information can therefore be translated in a better way, enhancing the translation accuracy.

In the embodiment of the disclosure, before the step 204, the method may further include generating a translator according to the grammar rule. The step 204 may specifically include translating the to-be-recognized sentence information by using the translator.

Specifically, a translator is generated according to the obtained grammar rule. A letter sequence that needs to be translated is translated through the translator. In the translation process, a translation result is synchronously stored in the service data structure inputted by the user. It should be noted that since the to-be-recognized sentence information is translated through the generated translator, the user may directly input, through the client, a letter sequence that needs to be translated into the translator for translation, so as to facilitate the user's operation.

In the embodiment of the disclosure, before the step 204, the method may further include converting a grammar format corresponding to the grammar rule into a grammar format supported by a preset language recognition tool; and inputting the grammar rule in the converted grammar format into the preset language recognition tool, so as to generate a translator corresponding to the grammar rule by using the preset language recognition tool. The step 204 may specifically include: translating the to-be-recognized sentence information by using the translator. The preset language recognition tool may be an existing language recognition tool, such as ANTLR, Yacc, or Lex. The preset language recognition tool may be pre-configured by a skilled person according to actual needs.

For example, a grammar format corresponding to the obtained grammar rule may be converted into a grammar format supported by ANTLR; and the grammar rule in the converted grammar format is inputted to ANTLR; a corresponding translator is generated by invoking ANTLR; and finally, an inputted letter sequence is translated by using the generated translator.

It should be noted that for the translation step in the embodiment of the disclosure, an inputted letter sequence may be locally translated by using a translator according to the obtained grammar rule itself; or a translator may be generated in advance according to the grammar rule and the translation process is implemented through the translator; and the translator may be locally created and generated according to the obtained grammar rule itself, or created and generated by invoking a preset language recognition tool, which specifically depends on the user's actual needs and is not limited in the embodiment of the disclosure.

Step 205: Send to the client the translation result in the service data structure.

Further, the client is enabled to display the translation result.

In another language recognition method provided in the embodiments of the disclosure, first, information of a service data structure inputted by a user and sent by a client is received. Then, a grammar rule is obtained from the information of the service data structure; and upon receiving to-be-recognized sentence information sent by the client, the to-be-recognized sentence information is translated with the grammar rule and a translation result is stored in the service data structure. As compared with current systems where a user needs to define a grammar rule by himself, the disclosure enables the obtaining of a grammar rule from the information of the service data structure inputted by a user so as to translate inputted sentence information with the grammar rule. The user does not need to figure out the grammar rule of a language by himself; the learning burden of the user is alleviated, thereby simplifying the process of language recognition and facilitating the user operation. Additionally, as compared with current systems where the translation result needs to be manually stored in a service data structure, the disclosure enables translation with the grammar rule obtained from the information of the service data structure, and the data structure where the translation result is stored is exactly the service data structure needed for storage, so that a process of automatically storing the translation result in the service data structure can be implemented, thereby improving the processing efficiency in language recognition.

Figure 3:
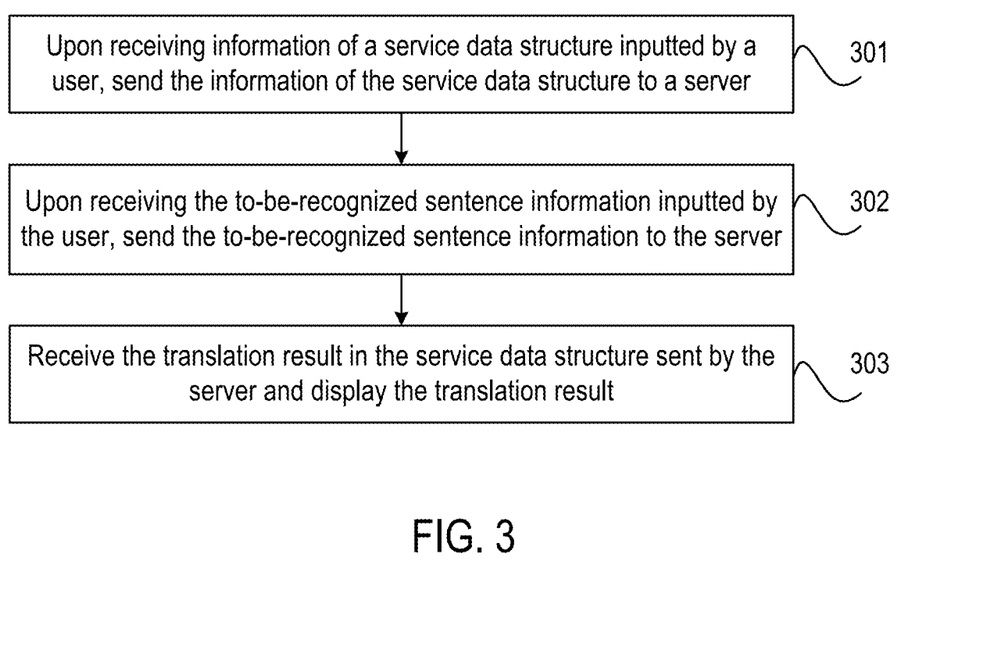
FIG. 3 is a flow diagram illustrating another language recognition method according to some embodiments of the disclosure.

Further, an embodiment of the disclosure provides still another language recognition method, which may be applied to a client. As shown in FIG. 3, the method includes the following steps.

Step 301: Upon receiving information of a service data structure inputted by a user, send the information of the service data structure to a server Further, the server is enabled to obtain a grammar rule from the information of the service data structure. Reference may be made to the corresponding descriptions in steps 101 to 102 for the concepts of the information of the service data structure and the grammar rule. Details will not be described herein again but are incorporated herein by reference in their entirety.

In the illustrated embodiment, the user may define a service data structure according to actual service requirements and input the defined service data structure information into the client; and the client receives the information of the service data structure and then sends it to the server, so that the server triggers an operation of obtaining a grammar rule from the information of the service data structure.

Step 302: Upon receiving the to-be-recognized sentence information inputted by the user, send the to-be-recognized sentence information to the server.

Further, the server is then enabled to translate the to-be-recognized sentence information with the grammar rule, store a translation result in the service data structure, and return to the client the translation result in the service data structure. Reference may be made to the corresponding description in step 103 for the concept of the to-be-recognized sentence information. Details will not be described herein again but are incorporated herein by reference in their entirety.

Step 303: Receive the translation result in the service data structure sent by the server and display the translation result.

In the still another language recognition method provided in the embodiment of the disclosure, first, information of a service data structure inputted by a user is sent to a server, so that the server acquires a grammar rule from the information of the service data structure; and then, to-be-recognized sentence information is sent to the server, so that the server translates the to-be-recognized sentence information with the grammar rule; and the server stores a translation result in a service data structure. As compared with current systems where a user needs to define a grammar rule by himself, the disclosure enables the obtaining of a grammar rule from the information of the service data structure inputted by a user so as to translate inputted sentence information with the grammar rule. The user does not need to figure out the grammar rule of a language by himself; the learning burden of the user is alleviated, thereby simplifying the process of language recognition and facilitating the user operation. Additionally, as compared with current systems where the translation result needs to be manually stored in a service data structure, the disclosure enables translation with the grammar rule obtained from the information of the service data structure, and the data structure where the translation result is stored is exactly the service data structure needed for storage, so that a process of automatically storing the translation result in the service data structure can be implemented, thereby improving the processing efficiency in language recognition.

Figure 4:
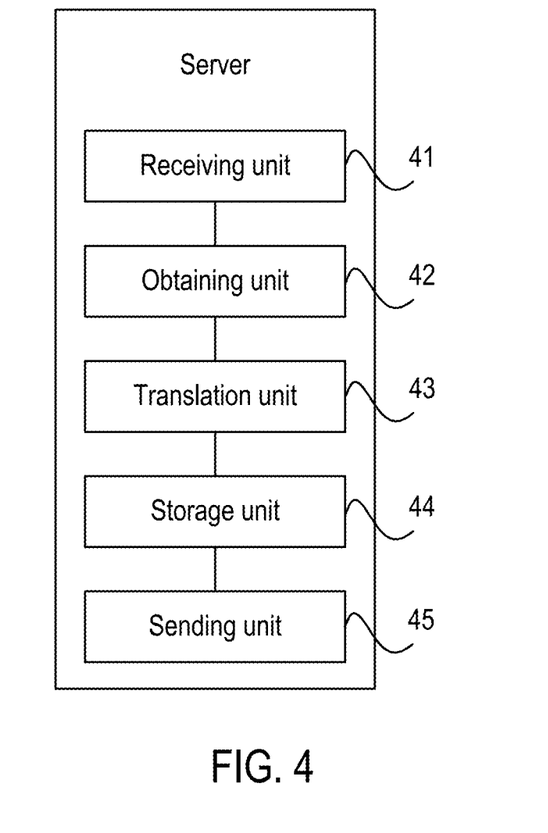
FIG. 4 is a block diagram of a server according to some embodiments of the disclosure.

Further, as the specific implementation of the method shown in FIG. 1, an embodiment of the disclosure provides a server. As shown in FIG. 4, the server may include: a receiving unit 41, an obtaining unit 42, a translation unit 43, a storage unit 44, and a sending unit 45.

The receiving unit 41 may be configured to receive, from a client, information of a service data structure. The receiving unit 41 is client-oriented and receives information sent by the client.

The obtaining unit 42 may be configured to obtain a grammar rule from the information of the service data structure received by the receiving unit 41. The obtaining unit 42 may be a main functional module for obtaining a grammar rule in this server.

The translation unit 43 may be configured to do the following: upon receiving to-be-recognized language information from the client, translate the to-be-recognized sentence information with the grammar rule obtained by the obtaining unit 42. The translation unit 43 is a main functional module for translating to-be-recognized sentence information in this server.

The storage unit 44 may be configured to store a translation result of the translation unit 43 in the service data structure. The storage unit 44 can automatically store a translation result in the service data structure, so that the processing efficiency of language recognition can be improved.

The sending unit 45 may be configured to send to the client the translation result in the service data structure.

Further, the client is enabled to display the translation result. The sending unit 45 is client-oriented and is configured to return processing information to the client.

It should be noted that the apparatus embodiment corresponds to the aforementioned method embodiment. Reference may be made to the corresponding description in FIG. 1 for details; for ease of reading, this apparatus embodiment will not provide details corresponding to the aforementioned method embodiment (these details incorporated herein by reference in their entirety). However, it should be clarified that the apparatus in this embodiment can correspondingly implement all of the contents in the aforementioned method embodiment.

In the server provided in the embodiments of the disclosure, first, information of a service data structure inputted by a user and sent by a client is received. Then, a grammar rule is obtained from the information of the service data structure; and upon receiving to-be-recognized sentence information sent by the client, the to-be-recognized sentence information is translated with the grammar rule and a translation result is stored in the service data structure. As compared with current systems where a user needs to define a grammar rule by himself, the disclosure enables the obtaining of a grammar rule from the information of the service data structure inputted by a user so as to translate inputted sentence information with the grammar rule. The user does not need to figure out the grammar rule of a language by himself; the learning burden of the user is alleviated, thereby simplifying the process of language recognition and facilitating the user operation. Additionally, as compared with current systems where the translation result needs to be manually stored in a service data structure, the disclosure enables translation with the grammar rule obtained from the information of the service data structure, and the data structure where the translation result is stored is exactly the service data structure needed for storage, so that a process of automatically storing the translation result in the service data structure can be implemented, thereby improving the processing efficiency in language recognition.

Figure 5:
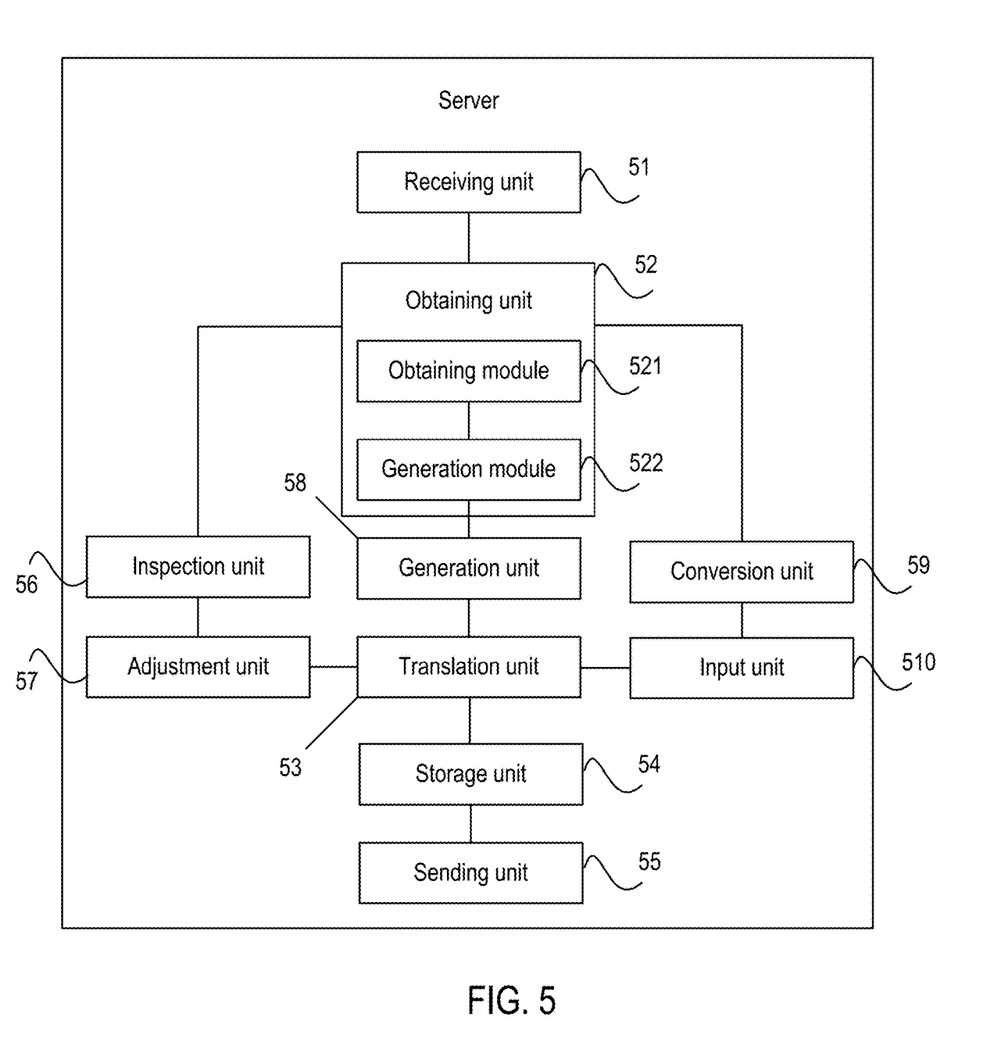
FIG. 5 is a block diagram of a server according to some embodiments of the disclosure.

Further, as the specific implementation of the method shown in FIG. 2, an embodiment of the disclosure provides another server. As shown in FIG. 5, the server may include: a receiving unit 51, an obtaining unit 52, a translation unit 53, a storage unit 54, and a sending unit 55.

The receiving unit 51 may be configured to receive, from a client, information of a service data structure. The receiving unit 51 is user-oriented and receives information sent by the client.

The obtaining unit 52 may be configured to obtain a grammar rule from the information of the service data structure received by the receiving unit 51. The obtaining unit 52 may be a main functional module for obtaining a grammar rule in this server.

The translation unit 53 may be configured to do the following: upon receiving to-be-recognized language information from the client, translate the to-be-recognized sentence information with the grammar rule obtained by the obtaining unit 52. The translation unit 53 is a main functional module for translating to-be-recognized sentence information in this server.

The storage unit 54 may be configured to store a translation result of the translation unit 53 in the service data structure. The storage unit 54 can automatically store a translation result in the service data structure, so that the processing efficiency of language recognition can be improved.

The sending unit 55 may be configured to send to the client the translation result in the service data structure.

Further, the client is enabled to display the translation result. The sending unit 55 is client-oriented and is configured to return processing information to the client.

Optionally, the information of the service data structure includes reflection information of data types corresponding to the service data structure.

Further, the obtaining unit 52 includes: an obtaining module 521 and a generation module 522.

The obtaining module 521 may be configured to obtain, from the information of the service data structure, data type information corresponding to the service data structure according to reflection information.

The generation module 522 may be configured to generate the grammar rule by using the data type information obtained by the obtaining module 521.

Optionally, the data type information comprises attribute information corresponding to the data types and an inclusion relationship between classes.

The generation module 522 may be specifically configured to determine a start symbol, a terminal symbol, and a nonterminal symbol corresponding to the grammar rule according to the attribute information corresponding to the data types.

The generation module 522 may be further specifically configured to determine a derivation rule corresponding to the grammar rule through the inclusion relationship between the classes.

The generation module 522 may be further specifically configured to generate the grammar rule by using the start symbol, the terminal symbol, the nonterminal symbol, and the derivation rule.

Further, the apparatus includes: an inspection unit 56 and an adjustment unit 57.

The inspection unit 56 may be configured to inspect whether the grammar rule has grammatical errors.

The adjustment unit 57 may be configured to adjust the grammar rule if the inspection unit 56 discovers that the grammar rule has grammatical errors.

The translation unit 53 may be specifically configured to translate the to-be-recognized sentence information by using the grammar rule adjusted by the adjustment unit 57.

Further, the apparatus includes: a generation unit 58.

The generation unit 58 may be configured to generate a translator according to the grammar rule obtained by the obtaining unit 52.

The translation unit 53 may be specifically configured to translate the to-be-recognized sentence information by using the translator generated by the generation unit 58.

Further, the apparatus includes: a conversion unit 59 and an input unit 510.

The conversion unit 59 may be configured to convert a grammar format corresponding to the grammar rule into a grammar format supported by a preset language recognition tool.

The input unit 510 may be configured to input the grammar rule in the grammar format converted by the conversion unit 59 into the preset language recognition tool so that a translator corresponding to the grammar rule can be generated through the preset language recognition tool.

The translation unit 53 may be specifically configured to translate the to-be-recognized sentence information by using the translator.

It should be noted that the apparatus embodiment corresponds to the aforementioned method embodiment. Reference may be made to the corresponding description in FIG. 2 for details; for ease of reading, this apparatus embodiment will not provide details corresponding to the aforementioned method embodiment. However, it should be clarified that the apparatus in this embodiment can correspondingly implement all of the contents in the aforementioned method embodiment.

The server includes a processor and a memory. The aforementioned receiving unit, obtaining unit, translation unit, storage unit, sending unit, inspection unit, adjustment unit, generation unit, conversion unit, and input unit are all stored as program units in the memory, and the processor executes the aforementioned program units that are stored in the memory to implement the corresponding functions.

The processor includes a kernel, and the kernel invokes corresponding functional units from the memory. One or more kernels may be provided. Kernel parameters are adjusted to solve the problem of display lag during the display of a selected graph in a diagram.

The memory may include a computer readable medium in the form of a non-permanent memory, a random-access memory (RAM) and/or non-volatile memory or the like, such as a read-only memory (ROM) or a flash memory (flash RAM), and the memory includes at least one storage chip.

In another server provided in the embodiments of the disclosure, first, information of a service data structure inputted by a user and sent by a client is received. Then, a grammar rule is obtained from the information of the service data structure; and upon receiving to-be-recognized sentence information sent by the client, the to-be-recognized sentence information is translated with the grammar rule and a translation result is stored in the service data structure. As compared with current systems where a user needs to define a grammar rule by himself, the disclosure enables the obtaining of a grammar rule from the information of the service data structure inputted by a user so as to translate inputted sentence information with the grammar rule. The user does not need to figure out the grammar rule of a language by himself; the learning burden of the user is alleviated, thereby simplifying the process of language recognition and facilitating the user operation. Additionally, as compared with current systems where the translation result needs to be manually stored in a service data structure, the disclosure enables translation with the grammar rule obtained from the information of the service data structure, and the data structure where the translation result is stored is exactly the service data structure needed for storage, so that a process of automatically storing the translation result in the service data structure can be implemented, thereby improving the processing efficiency in language recognition.

Figure 6:
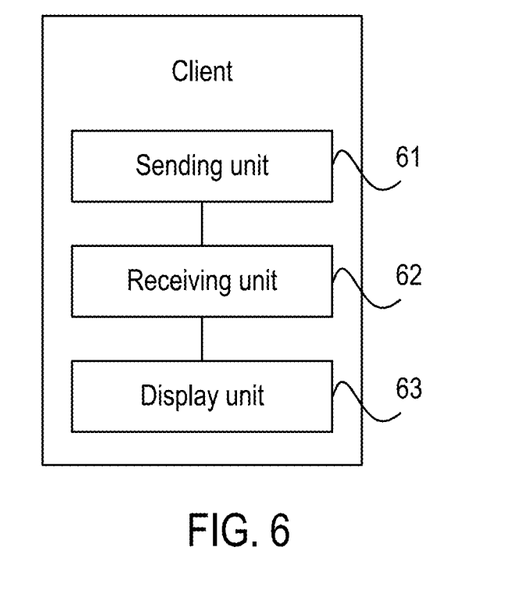
FIG. 6 is a block diagram of a client according to some embodiments of the disclosure.

Further, as the specific implementation of the method shown in FIG. 3, an embodiment of the disclosure provides a client. As shown in FIG. 6, the client may include: a sending unit 61, a receiving unit 62, and a display unit 63.

The sending unit 61 may be configured to do the following: upon receiving information of a service data structure inputted by a user, send the information of the service data structure to the server.

Further, the server is enabled to obtain a grammar rule from the information of the service data structure.

The sending unit 61 may be further configured to do the following: upon receiving the to-be-recognized sentence information inputted by the user, send the to-be-recognized sentence information to the server.

Further, the server is then enabled to translate the to-be-recognized sentence information with the grammar rule and store a translation result in a service data structure.

The receiving unit 62 may be configured to receive the translation result in the service data structure sent by the server.

The display unit 63 may be configured to display the translation result that | the receiving unit 62 has received.

It should be noted that reference may be made to the corresponding description in FIG. 3 for other corresponding descriptions of various functional units involved in the client provided in the embodiment of the disclosure. Details will not be described herein again but are incorporated herein by reference in their entirety.

In the client provided in the embodiment of the disclosure, first, information of a service data structure inputted by a user is sent to a server, so that the server acquires a grammar rule from the information of the service data structure; and then, to-be-recognized sentence information is sent to the server, so that the server translates the to-be-recognized sentence information with the grammar rule; and the server stores a translation result in a service data structure. As compared with current systems where a user needs to define a grammar rule by himself, the disclosure enables the obtaining of a grammar rule from the information of the service data structure inputted by a user so as to translate inputted sentence information with the grammar rule. The user does not need to figure out the grammar rule of a language by himself; the learning burden of the user is alleviated, thereby simplifying the process of language recognition and facilitating the user operation. Additionally, as compared with current systems where the translation result needs to be manually stored in a service data structure, the disclosure enables translation with the grammar rule obtained from the information of the service data structure, and the data structure where the translation result is stored is exactly the service data structure needed for storage, so that a process of automatically storing the translation result in the service data structure can be implemented, thereby improving the processing efficiency in language recognition.

Figure 7:
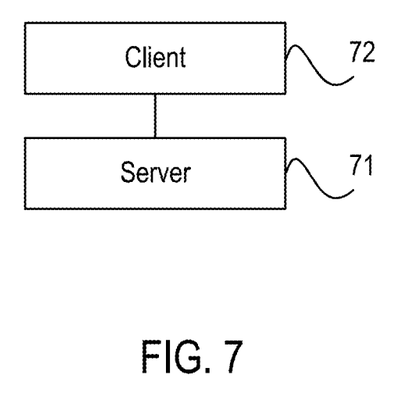
FIG. 7 is a block diagram of a language recognition system according to some embodiments of the disclosure.

Further, an embodiment of the disclosure provides a language recognition system, which as shown in FIG. 7, includes: a server 71 and a client 72.

The client 72 may be configured to do the following: upon receiving information of a service data structure inputted by a user, send the information of the service data structure to the server 71.

The server 71 may be configured to receive the information of the service data structure sent by the client 72; and obtain a grammar rule from the information of the service data structure.

The client 72 may further be configured to do the following: upon receiving the to-be-recognized sentence information inputted by the user, send the to-be-recognized sentence information to the server 71.

The server 71 may further be configured to do the following: upon receiving the to-be-recognized language information from the client, translate the to-be-recognized sentence information by using the grammar rule and store a translation result in the service data structure; and send the translation result in the service data structure to the client 72.

The client 72 may further be configured to receive the translation result in the service data structure sent by the server 71 and display the translation result.

In the language recognition system provided in the embodiments of the disclosure, a server first receives information of a service data structure inputted by a user and sent by a client. Then, a grammar rule is obtained from the information of the service data structure; and upon receiving to-be-recognized sentence information sent by the client, the to-be-recognized sentence information is translated with the grammar rule and a translation result is stored in the service data structure. As compared with current systems where a user needs to define a grammar rule by himself, the disclosure enables the obtaining of a grammar rule from the information of the service data structure inputted by a user so as to translate inputted sentence information with the grammar rule. The user does not need to figure out the grammar rule of a language by himself; the learning burden of the user is alleviated, thereby simplifying the process of language recognition and facilitating the user operation. Additionally, as compared with current systems where the translation result needs to be manually stored in a service data structure, the disclosure enables translation with the grammar rule obtained from the information of the service data structure, and the data structure where the translation result is stored is exactly the service data structure needed for storage, so that a process of automatically storing the translation result in the service data structure can be implemented, thereby improving the processing efficiency in language recognition.

The disclosure further provides a computer program product, which when executed on a data processing device, is adapted to initialize and execute program codes have the following method steps: receiving information of a service data structure sent by a client; obtaining a grammar rule from the information of the service data structure; upon receiving to-be-recognized sentence information sent by the client, translating the to-be-recognized sentence information with the grammar rule and storing a translation result in a service data structure; and sending the translation result in the service data structure to the client, so that the client displays the translation result.

Those skilled in the art should understand that embodiments of the disclosure may be provided as a method, a system, or a computer program product. Therefore, the disclosure may use the form of a full hardware embodiment, a full software embodiment, or an embodiment combining software and hardware. Moreover, the disclosure may use the form of a computer program product implemented on one or more computer usable storage media (including, but not limited to, a magnetic disk memory, a CD-ROM, an optical memory, and so on) containing computer usable program code therein.

The disclosure is described with reference to flowcharts and/or block diagrams of a method and an apparatus for displaying a graph in a diagram and a computer program product according to embodiments of the disclosure. It should be understood that each flow and/or block in the flowcharts and/or block diagrams, and a combination of flows and/or blocks in the flowcharts and/or block diagrams can be implemented with computer program instructions. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may also be stored in a computer-readable memory that can direct a computer or another programmable data processing device to operate in a particular manner, such that the instructions stored in the computer-readable memory produce an article of manufacture including instruction means, the instruction means implementing the functions specified in one or more flows of the flowcharts and/or one or more blocks of the block diagrams.

These computer program instructions may also be loaded onto a computer or another programmable data processing device so that a series of operational steps are performed on the computer or another programmable device to produce computer-implemented processing, and thus the instructions executed on the computer or another programmable device provide the steps for implementing the functions specified in one or more flows of the flowcharts and/or one or more blocks of the block diagrams.

In a typical configuration, the computing device includes one or more processors (CPUs), input/output interfaces, network interfaces, and memories.

The memory may include a computer readable medium in the form of a non-permanent memory, a random access memory (RAM) and/or non-volatile memory or the like, such as a read-only memory (ROM) or a flash memory (flash RAM). The memory is an example of a computer readable medium.

The computer readable medium includes permanent and non-permanent, movable and non-movable media that can achieve information storage by means of any methods or techniques. The information may be computer readable instructions, data structures, modules of programs or other data. Examples of a storage medium of a computer include, but are not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible by a computing device. In light of the definitions herein, the computer readable medium does not include transitory computer readable media (transitory media), such as modulated data signals and carrier waves.

The above descriptions are merely the embodiments of the disclosure and are not intended to limit the disclosure. For those skilled in the art, the disclosure may have various alterations and changes. Any modifications, equivalent substitutions, improvements and the like made within the spirit and principle of the disclosure shall fall within the scope of the claims of the disclosure.

What is claimed is:

1. A method comprising:
    receiving, at a server device from a client device, a service data structure defined using a programming language, the service data structure including one or more data types;
    generating, by the server device, a grammar rule based on the one or more data types of the service data structure;
    detecting, by the server device, that the grammar rule contains one or more errors;
    generating, by the server device, an adjusted grammar rule by changing an internal ordering of the grammar rule based on the one or more errors;
    receiving, at the server device from the client device, language information;
    translating, by the server device, the language information using the adjusted grammar rule;
    storing, by the server device, the translation result in the service data structure; and
    transmitting, by the server device to the client device, the translation result in the service data structure.

2. The method of claim 1, the obtaining a grammar rule comprising obtaining a four-part grammar rule, the four-part grammar rule comprising a start symbol, terminal symbol, nonterminal symbol, and a derivation rule.

3. The method of claim 1, the obtaining a grammar rule comprising mapping the service data structure to a grammar rule based on an analysis of the contents of the service data structure.

4. The method of claim 1, the receiving language information comprise receiving a letter sequence inputted by a user of the client device.

5. The method of claim 1, the receiving a service data structure comprising receiving a service data structure including reflection information of data types corresponding to the service data structure, the reflection information comprising an annotation of the data structure.

6. The method of claim 5, the method further comprising obtaining, by the server device, data type information based on the reflection information.

7. The method of claim 6, the obtaining a grammar rule comprising generating, by the server device, the grammar rule based on the data type information.

8. The method of claim 7, the generating the grammar rule based on the data type information comprising:
    determining, by the server device, a start symbol, terminal symbol, and nonterminal symbol corresponding to the grammar rule based on attribute information corresponding to the data type information;
    determining, by the server device, a derivation rule corresponding to the grammar rule using an inclusion relationship between classes in the service data structure; and
    generating, by the server device, the grammar rule using the start symbol, terminal symbol, nonterminal symbol, and derivation rule.

9. The method of claim 1, further comprising:
    converting, by the server device, a first grammar format corresponding to the grammar rule into a second grammar format, the second grammar format comprising a grammar format supported by a preset language recognition tool; and
    using, by the server device, the second grammar format to generate the grammar rule.

10. An apparatus comprising:
    a processor; and
    a storage medium for tangibly storing thereon program logic for execution by the processor, the stored program logic comprising:
        logic, executed by the processor, for receiving, from a client device, a service data structure defined using a programming language, the service data structure including one or more data types;
        logic, executed by the processor, for generating a grammar rule based on the one or more data types of the service data structure;

logic, excited by the processor, for detecting that the grammar rule contains one or more errors;

logic, excited by the processor, for generating an adjusted grammar rule by changing an internal ordering of the grammar rule based on the one or more errors;

logic, executed by the processor, for receiving, from the client device, language information;

logic, executed by the processor, for translating the language information using the adjusted grammar rule;

logic, executed by the processor, for storing the translation result in the service data structure; and logic, executed by the processor, for transmitting, to the client device, the translation result in the service data structure.

11. The apparatus of claim 10, the logic for obtaining a grammar rule comprising logic, executed by the processor, for obtaining a four-part grammar rule, the four-part grammar rule comprising a start symbol, terminal symbol, nonterminal symbol, and a derivation rule.

12. The apparatus of claim 10, the logic for obtaining a grammar rule comprising logic, executed by the processor, for mapping the service data structure to a grammar rule based on an analysis of the contents of the service data structure.

13. The apparatus of claim 10, the logic for receiving language information comprise logic, executed by the processor, for receiving a letter sequence inputted by a user of the client device.

14. The apparatus of claim 10, the logic for receiving a service data structure comprising logic, executed by the processor, for receiving a service data structure including reflection information of data types corresponding to the service data structure, the reflection information comprising an annotation of the data structure.

15. The apparatus of claim 14, the stored program logic further comprising logic, executed by the processor, for obtaining data type information based on the reflection information.

16. The apparatus of claim 15, the logic for obtaining a grammar rule comprising logic, executed by the processor, for generating the grammar rule based on the data type information.

17. The apparatus of claim 16, the logic for generating the grammar rule based on the data type information comprising:

logic, executed by the processor, for determining a start symbol, terminal symbol, and nonterminal symbol corresponding to the grammar rule based on attribute information corresponding to the data type information;

logic, executed by the processor, for determining a derivation rule corresponding to the grammar rule using an inclusion relationship between classes in the service data structure; and logic, executed by the processor, for generating the grammar rule using the start symbol, terminal symbol, nonterminal symbol, and derivation rule.

18. The apparatus of claim 10, the logic for translating the language information using the grammar rule further comprising:

logic, executed by the processor, for generating a translator based on the grammar rule;

logic, executed by the processor, for translating the language information using the translator.

19. The apparatus of claim 10, the stored program logic further comprising:

logic, executed by the processor, for converting a first grammar format corresponding to the grammar rule into a second grammar format, the second grammar format comprising a grammar format supported by a preset language recognition tool; and logic, executed by the processor, for using the second grammar format to generate the grammar rule.

* * * * *